(12) United States Patent
Chuang et al.

(10) Patent No.: US 10,863,148 B2
(45) Date of Patent: Dec. 8, 2020

(54) TILE-SELECTION BASED DEEP DEMOSAICING ACCELERATION

(71) Applicant: QUALCOMM Incorporated, San Diego, CA (US)

(72) Inventors: Shang-Chih Chuang, San Diego, CA (US); Xiaoyun Jiang, San Diego, CA (US); Jun Zuo Liu, Yunlin (TW)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/010,313

(22) Filed: Jun. 15, 2018

(65) Prior Publication Data

US 2019/0387205 A1  Dec. 19, 2019

(51) Int. Cl.
*H04N 9/45* (2006.01)
*H04N 9/04* (2006.01)
*H04N 5/357* (2011.01)
*G06T 3/40* (2006.01)
*G06T 5/00* (2006.01)
*H04N 9/64* (2006.01)

(52) U.S. Cl.
CPC ........... *H04N 9/045* (2013.01); *G06T 3/4007* (2013.01); *G06T 3/4015* (2013.01); *G06T 5/00* (2013.01); *H04N 5/357* (2013.01); *H04N 9/646* (2013.01); *G06T 2207/10024* (2013.01); *G06T 2207/20021* (2013.01); *G06T 2207/20221* (2013.01); *H04N 2209/046* (2013.01)

(58) Field of Classification Search
CPC ...................................................... H04N 9/045
USPC ........................................................ 348/242
See application file for complete search history.

(56) References Cited

U.S. PATENT DOCUMENTS

2013/0113951 A1\* 5/2013 Jannard ................ H04N 5/3675
348/222.1

\* cited by examiner

*Primary Examiner* — Joel W Fosselman
(74) *Attorney, Agent, or Firm* — Qualcomm Incorporated

(57) ABSTRACT

Aspects of the present disclosure relate to systems and methods for selectively processing tiles of a captured image. The captured image may be parsed into a plurality of tiles. A subset of the plurality of tiles may be selected based at least in part on at least one metric. The selected tiles may be processed according to a first technique, while each unselected tile may be selectively processed according to one or more techniques different from the first technique. The first technique and the one or more techniques may each be either an image demosaicing technique or an image denoising technique.

38 Claims, 9 Drawing Sheets ns
TILE-SELECTION BASED DEEP DEMOSAICING ACCELERATION

TECHNICAL FIELD

This disclosure relates generally to systems and methods for reconstructing color images using interpolation-based techniques, such as demosaicing techniques for images captured using colored filter array (CFA) sensors.

BACKGROUND OF RELATED ART

An image sensor incorporating a color filter array (CFA) may have a mosaic of color filters for capturing color information covering the image sensor. For example, a Bayer image sensor may incorporate a CFA having a specified pattern of red, blue, and green filters for capturing red, blue, and green pixels. Reconstructing color images from information captured using CFA image sensors requires use of an interpolation method called demosaicing.

Demosaicing may be used for estimating pixel values based on interpolating the values of nearby pixels when the pixel value is not measured or available. For example, green and blue color information may not be directly available at a pixel location covered by a red filter of a Bayer image sensor. As a result, the green and blue color information of the pixel is interpolated from values of nearby green and blue pixels. Interpolation may cause inaccuracies in the color information, such as artifacts, moiré patterns, or an incorrect color.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for selectively processing tiles of a captured image. In one example implementation, a method for selectively processing tiles of a captured image is disclosed. The example method may include parsing the captured image into a plurality of tiles, selecting a subset of the plurality of tiles based at least in part on at least one metric, processing the selected tiles according to a first technique, and selectively processing each unselected tile according to one or more techniques different from the first technique. The first technique and the one or more techniques may each be either an image demosaicing technique or an image denoising technique.

In another example, an image processing device configured to selectively process tiles of a captured image is disclosed. The example image processing device may include one or more processors, and a memory coupled to the one or more processors and including instructions for execution by the one or more processors. Execution of these instructions may cause the image processing device to perform operations comprising parsing the captured image into a plurality of tiles, selecting a subset of the plurality of tiles based at least in part on at least one metric, processing the selected tiles according to a first technique, and selectively processing each unselected tile according to one or more techniques different from the first technique The first technique and the one or more techniques may each be either an image demosaicing technique or an image denoising technique.

In another example, a non-transitory computer-readable medium is disclosed. The non-transitory computer-readable medium may store instructions that, when executed by a processor, cause a device to perform operations comprising parsing a captured image into a plurality of tiles, selecting a subset of the plurality of tiles based at least in part on at least one metric, processing the selected tiles according to a first technique, and selectively process each unselected tile according to one or more techniques different from the first technique. The first technique and the one or more techniques are each one from the group consisting of an image demosaicing technique or an image denoising technique.

In another example, an image processing device is disclosed. The device includes means for parsing a captured image into a plurality of tiles, means for selecting a subset of the plurality of tiles based at least in part on at least one metric, means for processing the selected tiles according to a first technique, and means for selectively processing each unselected tile according to one or more techniques different from the first technique. The first technique and the one or more techniques may each be either an image demosaicing technique or an image denoising technique.

BRIEF DESCRIPTION OF THE DRAWINGS

Aspects of the present disclosure are illustrated by way of example, and not by way of limitation, in the figures of the accompanying drawings and in which like reference numerals refer to similar elements.

DETAILED DESCRIPTION

Figure 1:
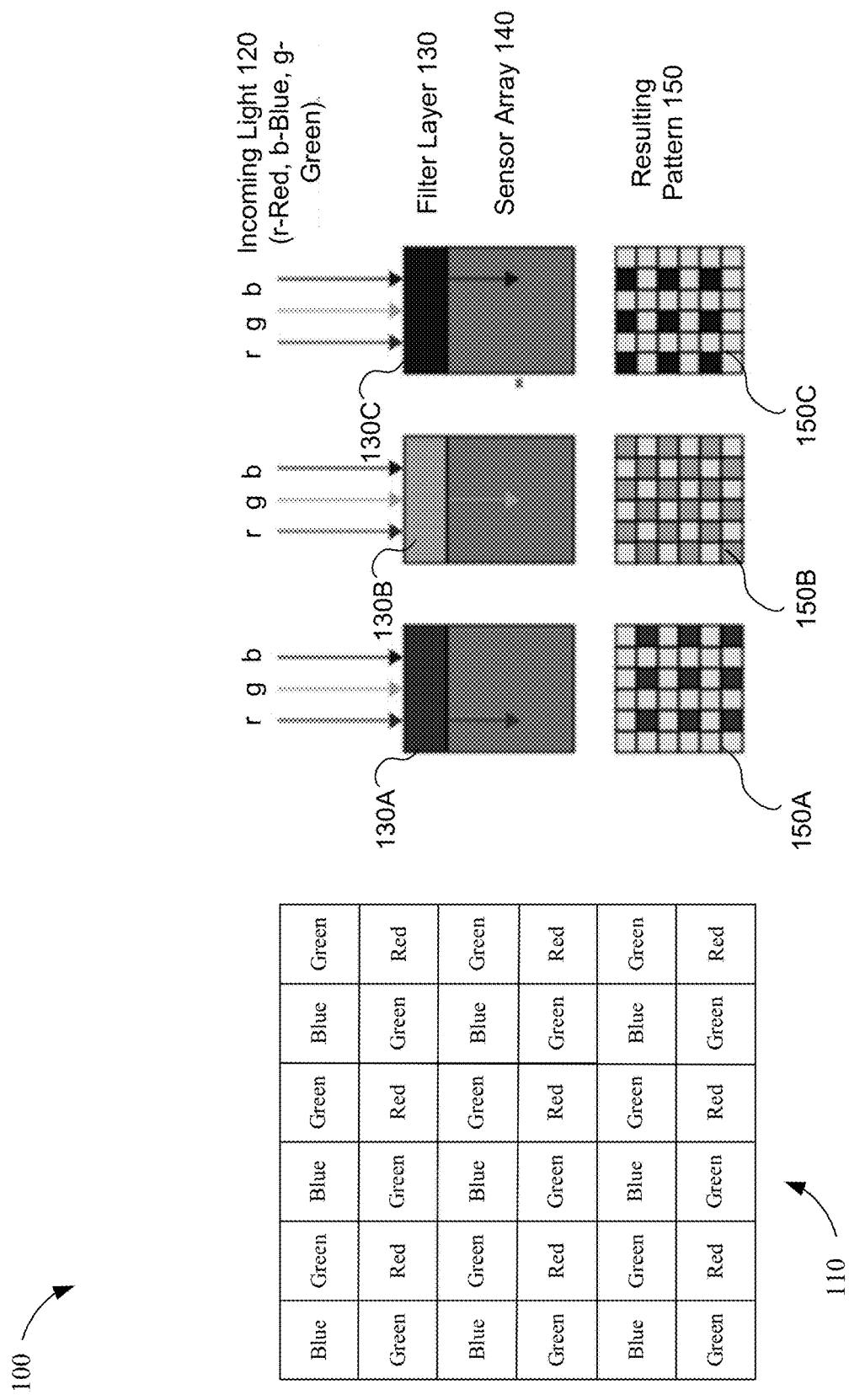
FIG. 1 is an illustration of an example color filter array (CFA) image sensor structure.

Aspects of the present disclosure may be used for demosaicing images captured by a color filter array (CFA) image sensor. An image may be received and parsed into a plurality of tiles, each of which may be selectively processed according to one of a plurality of demosaicing techniques based on one or more metrics. For example, tiles may be selected for processing according to a first demosaicing technique, such as a deep neural network based technique, based on a tile having a sum of absolute differences (SAD) metric exceeding an SAD threshold and/or on a pixel saturation (SAT) metric being less than an SAT threshold. Unselected tiles may be processed according to a demosaicing technique different from the first demosaicing technique, such as a hardware-based demosaicing technique. This selective processing may allow for computational resources to be more efficiently allocated. More particularly, the selective processing may determine which portions of the image may benefit more from the increased quality of the first demosaicing technique, while allowing remaining portions of the image to benefit from the reduced complexity of the second demosaicing technique.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, techniques, algorithms, logic blocks, processing and other symbolic representations of operations on data bits within a computer memory. In the present disclosure, a procedure, technique, algorithm, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable image processing device (such as cameras, smartphones, tablets, laptop computers, or other devices) that captures or processes images captured using one or more image sensors, such as one or more CFA image sensors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

FIG. 1 is an illustration of an example color filter array (CFA) image sensor 100. The CFA image sensor 100 may include a plurality of color filters overlaid on an image sensor and to capture color information for a plurality of pixels. For example, the CFA image sensor 100 may be a Bayer image sensor including a repeating pattern of red, green, and blue (RGB) color filters, as shown in pixel pattern 110. Each pixel of the pixel pattern 110 indicates a location of the CFA image sensor 100 having a filter configured to capture light only of the indicated color. For example, while incoming light 120 may include red, blue, and green light, the color filters of the filter layer 130 may only allow light of a limited spectrum to pass through to the sensor array 140. For example, the red filter 130A may only pass red light, and the passed red light incident on the CFA image sensor 100 may produce the resulting pattern 150A. Similarly, the green filter 130B may only pass green light, and the passed green light incident on the CFA image sensor 100 may produce the resulting pattern 150B. Additionally, the blue filter 130C may only pass blue light, and the passed blue light incident on the CFA image sensor 100 may produce the resulting pattern 150C.

Information about each color is not available at each pixel location of a CFA image sensor, such as the CFA image sensor 100. Instead, one or more pixels include red color data (such as the pixels in the pattern 150A), one or more pixels include green color data (such as the pixels in the pattern 150B), and one or more pixels include blue color data (such as the pixels in the pattern 150C). Estimating red and green data at a blue pixel typically requires interpolation of surrounding color data since no red and green data is captured at the blue pixel. The interpolation may be inaccurate, and may also introduce artifacts, moiré patterns and/or false colors into an interpolated image.

Figure 2:
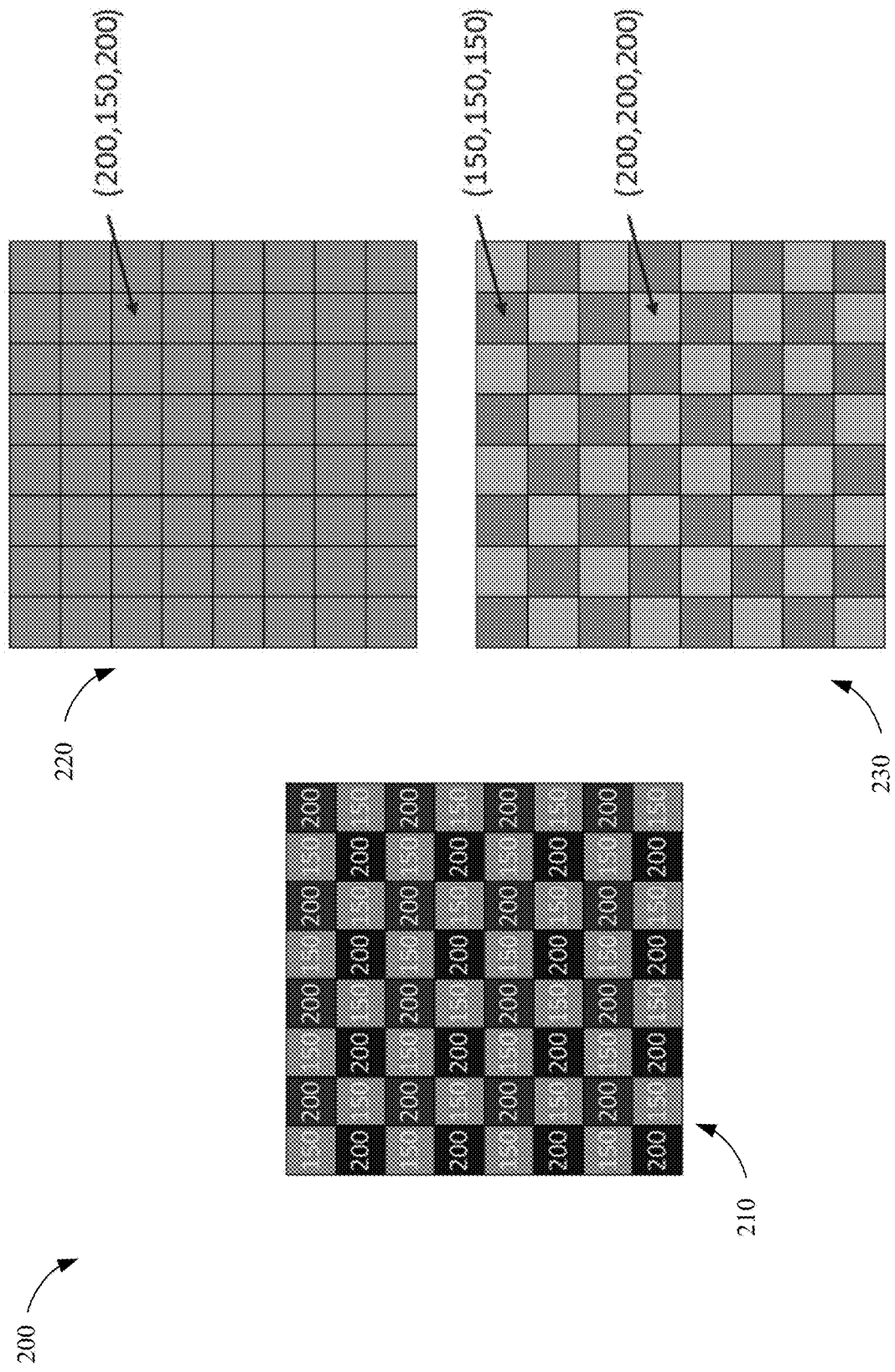
FIG. 2 is an example illustration of two different images, which may be captured as the same mosaiced image.

In addition, the interpolation may introduce uncertainty into the underlying image data which is captured by the CFA sensor. For example, FIG. 2 is an illustration 200 showing how two different image patches may be captured as having the same pixel values using a CFA sensor. More particularly, image patch 220 is an image where each pixel has an (R, G, B) value of (200, 150, 200), where R, G, and B represent respective contributions of red, green, and blue light on a scale of 0-255 (8-bit). Image patch 230 has a greyscale checkerboard pattern of (150, 150, 150) pixels and (200, 200, 200) pixels. However, when captured by a CFA image sensor having a Bayer pattern, such as described above with respect to FIG. 1, image patch 220 and image patch 230 may result in identical values at each pixel of the sensor. Thus, if the CFA image sensor captures a scene having an image patch 210, it is not clear whether the scene captured by the CFA image sensor corresponds to image patch 220 or to image patch 230. In particular, heuristic methods for interpolation of image data cannot determine image patch 220 from image patch 230.

Interpolation may introduce artifacts, moiré patterns and/or false colors into an interpolated image, which may result from the frequency-domain interrelatedness of chrominance and luminance in the CFA image spectrum. For example, the CFA image spectrum may include contributions from luminance (L) and contributions from chrominance ($C_1$ and $C_2$), as depicted in equation (1) below:

$$f_{CFA}(n_1, n_2) = \\ f_L(n_1, n_2) + f_{C1}(n_1, n_2)(-1)^{n_1+n_2} + f_{C2}(n_1, n_2)((-1)^{n_1} - (-1)^{n_2}) = \\ f_L(n_1, n_2) + f_{C1}(n_1, n_2)e^{\frac{j2\pi(n_1+n_2)}{2}} + f_{C2}(n_1, n_2)\left(e^{\frac{j2\pi n_1}{2}} - e^{\frac{j2\pi n_2}{2}}\right) \quad (1)$$

where f represents the spatial domain CFA image, $n_1$ represents a line number, and $n_2$ represents a color number. The association represented in the frequency domain is depicted in equation (2) below:

$$F_{CFA}(u,v) = F_L(u,v) + F_{C1}(u-0.5, v-0.5) + F_{C2}(u-0.5, v) - F_{C2}(u, v-0.5) \quad (2)$$

where u and v correspond respectively to $n_1$ and $n_2$. High frequency portions of the luminance spectrum may overlap and interfere with the chrominance spectrum. Such interference may result in a false color, and may result in artifacts in the demosaiced CFA images.

Figure 3:
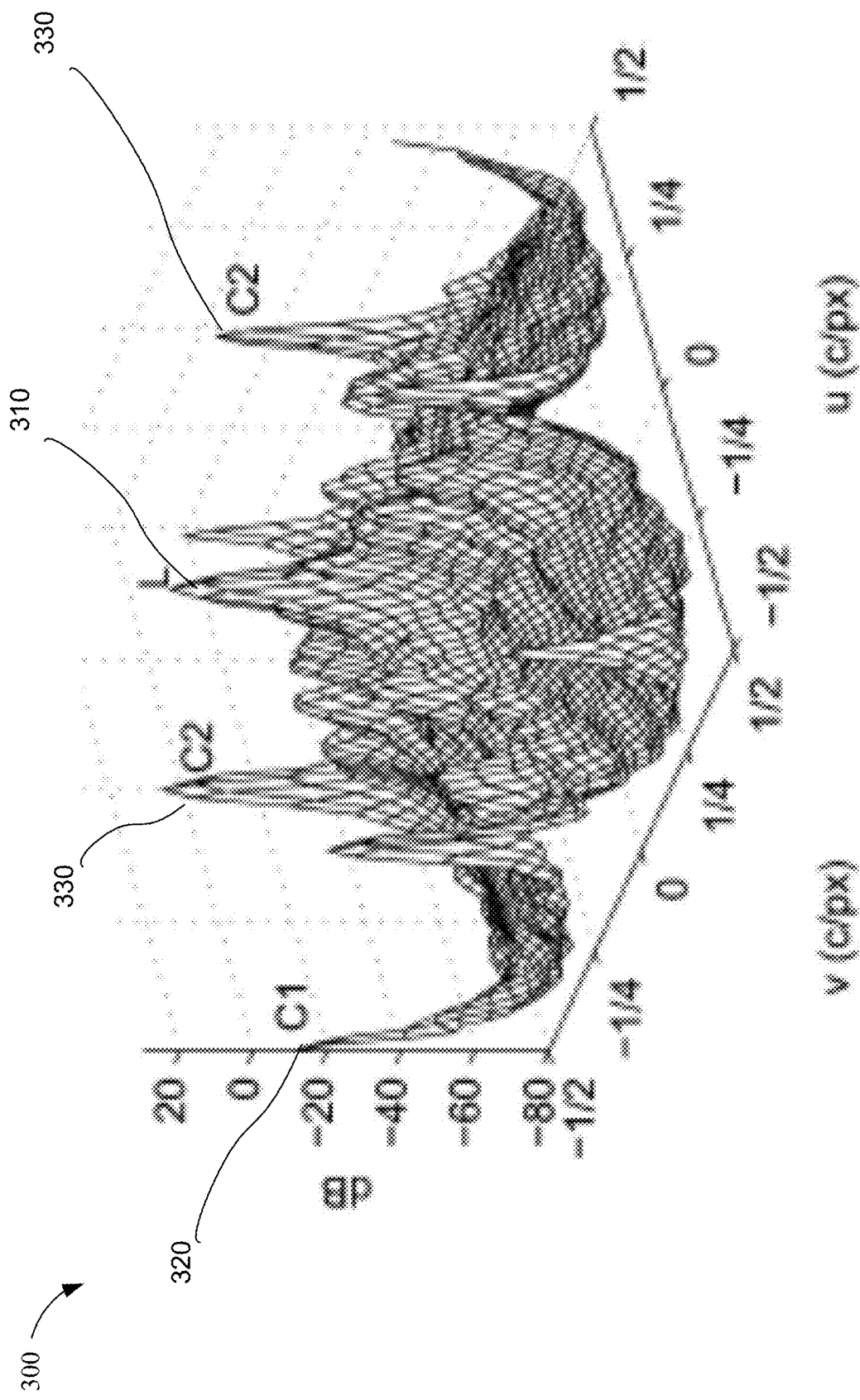
FIG. 3 is an illustration of an example spectral relatedness of luminance and chrominance for a CFA image.

FIG. 3 is an illustration of a graph depicting an example CFA image spectrum 300. With respect to FIG. 3, the CFA image spectrum 300 includes peaks corresponding to a peak 310 of the luminance spectrum (L), and peaks 320 and 330 respectively corresponding to the chrominance spectrums of C1 and C2. While the L spectrum peaks at (u,v)=(0,0), there may exist high frequency details in the luminance spectrum—for example, closely spaced patterns of light and dark. In such images, the luminance spectrum may overlap the peaks of the chrominance spectrum and result in false colors and moiré patterns in demosaiced images. Demosaicing the image may correspond to separating and estimating the luminance spectrum and the chrominance spectrum. As part of this separation and estimation, energy of the combined spectrum may incorrectly be assigned to the chrominance or to the luminance signals. This may introduce artifacts and false colors into the demosaiced image.

Figure 4:
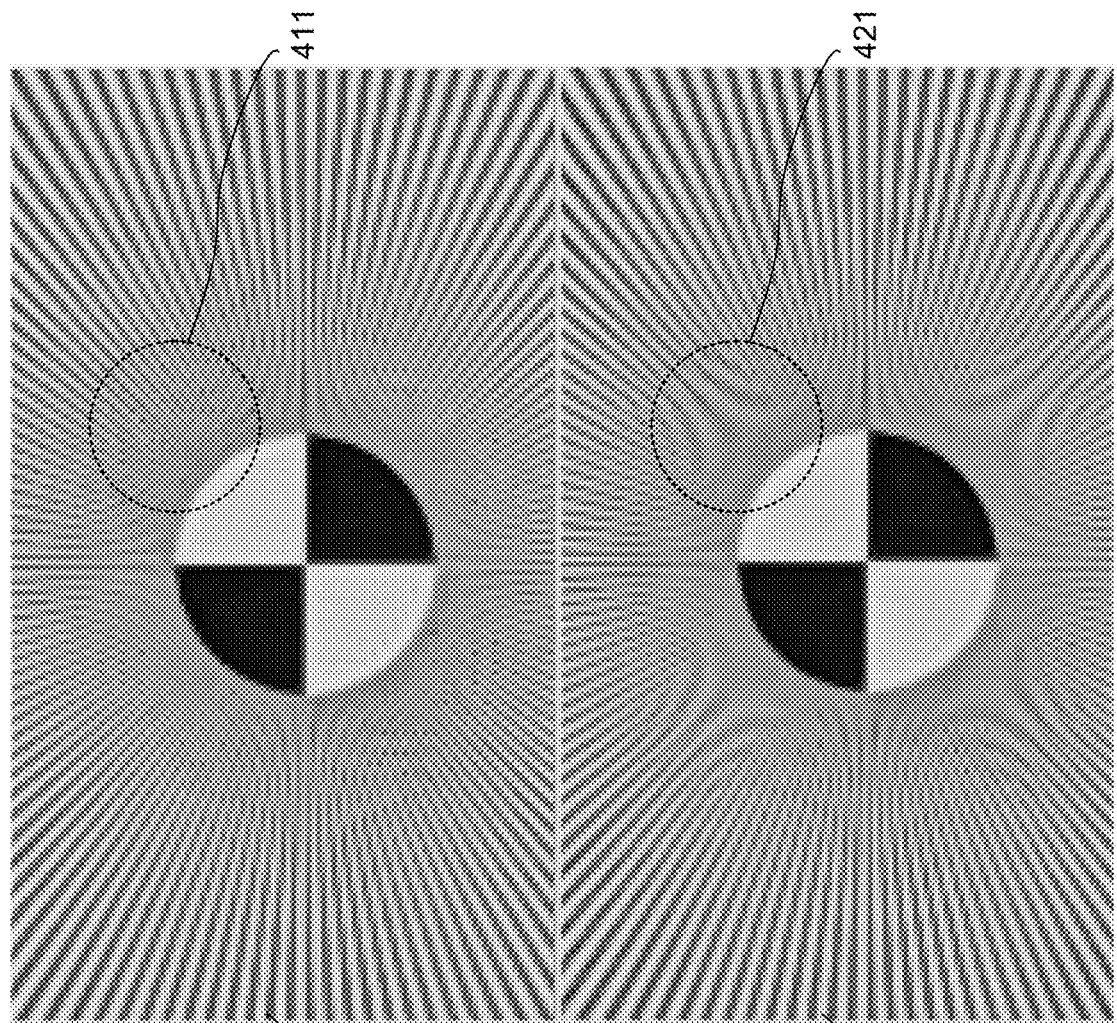
FIG. 4 is an illustration of example artifacts and moiré patterns that may result from demosaicing of a CFA image.

FIG. 4 is an illustration of example images 400 exhibiting moiré patterns and artifacts which may result from demosaicing. The images shown include closely spaced regions of light and dark, and the luminance spectrum includes high frequency regions, which may overlap the chrominance spectrum. If relatively more energy is assigned to the luminance spectrum, a demosaiced image such as image 410 may result, which may include regions containing artifacts, such as region 411. Similarly, if relatively more energy is assigned to the chrominance spectrum, then a demosaiced image such as image 420 may result, including regions containing moiré patterns such as region 421. Note that a false color may also be exhibited in regions 411 and 421, which are not reflected in FIG. 4. For example, color may be present in region 421, such as green, red, or other colors not found in the original black and white image.

While conventional interpolation techniques may result in accurate demosaicing in many cases and are implemented in hardware, errors may be introduced when demosaicing using such techniques in other cases. For example, moiré patterns, false colors, and/or artifacts may be introduced, as discussed above. These conventional interpolation techniques may be described as "hardware-based," and may refer to a variety of hardware-friendly demosaicing techniques, such as nearest-neighbor, bilinear, bicubic, and so on. As compared with software-based techniques, hardware-based techniques may be more hardware-friendly because they generally require less line buffer usage, may require simpler logic, may use less memory, may involve more localized calculations as opposed to being optimized over a wider area, and may be more easily parallelized for real-time processing.

In contrast to hardware-based techniques, software-based demosaicing may generally require greater amounts of line buffer data, or perhaps even full frame data from one or more frames. Further, software-based techniques may require more memory usage, for example for storing intermediate image data. Software-based techniques may also involve more complicated logic for calculation. While requiring more resources, as noted above, software-based techniques may be more flexible, and may be more accurate if sufficient processing time is available.

Some example software-based demosaicing techniques may include deep neural networks (DNNs). For example, a DNN may be trained on a large image set to train the DNN to recognize common regularities in the image set. DNN based techniques may result in improved quality of demosaiced images, and reduction in the false color, moiré patterns, and artifacts from conventional techniques. However, DNN based techniques are more complex than conventional interpolation techniques, and may be prohibitively expensive in computation and time. For example, the time required to implement a DNN based technique for images having multiple megapixels may be several minutes, which may be prohibitively long for many image processing applications (such as an image capture or preview by a mobile device). DNN techniques are typically more efficient for downscaled images to decrease overall processing time and complexity (such as for computer vision). It would therefore be desirable to incorporate the benefits of DNN based techniques for image processing in a more computationally and temporally efficient manner.

In some example implementations, DNN based processing may be performed on regions of an image to benefit from the improved quality of processing, and conventional processing techniques may be performed on other regions of the image. For example, the image may be considered as a plurality of tiles. Each tile may be regularly shaped, such as rectangular, square, or other suitable shape. The size of each tile may be 5 pixels by 5 pixels (5×5), 7×7, 10×10, or another size. One or more metrics may be used for selecting the tiles of an image to be processed using DNN based techniques. Example metrics may include a sum of absolute differences (SAD) metric, an image saturation (SAT) metric, or other suitable metrics. The metrics may be used individually or in combination for selecting the tiles for DNN based processing.

Figure 5:
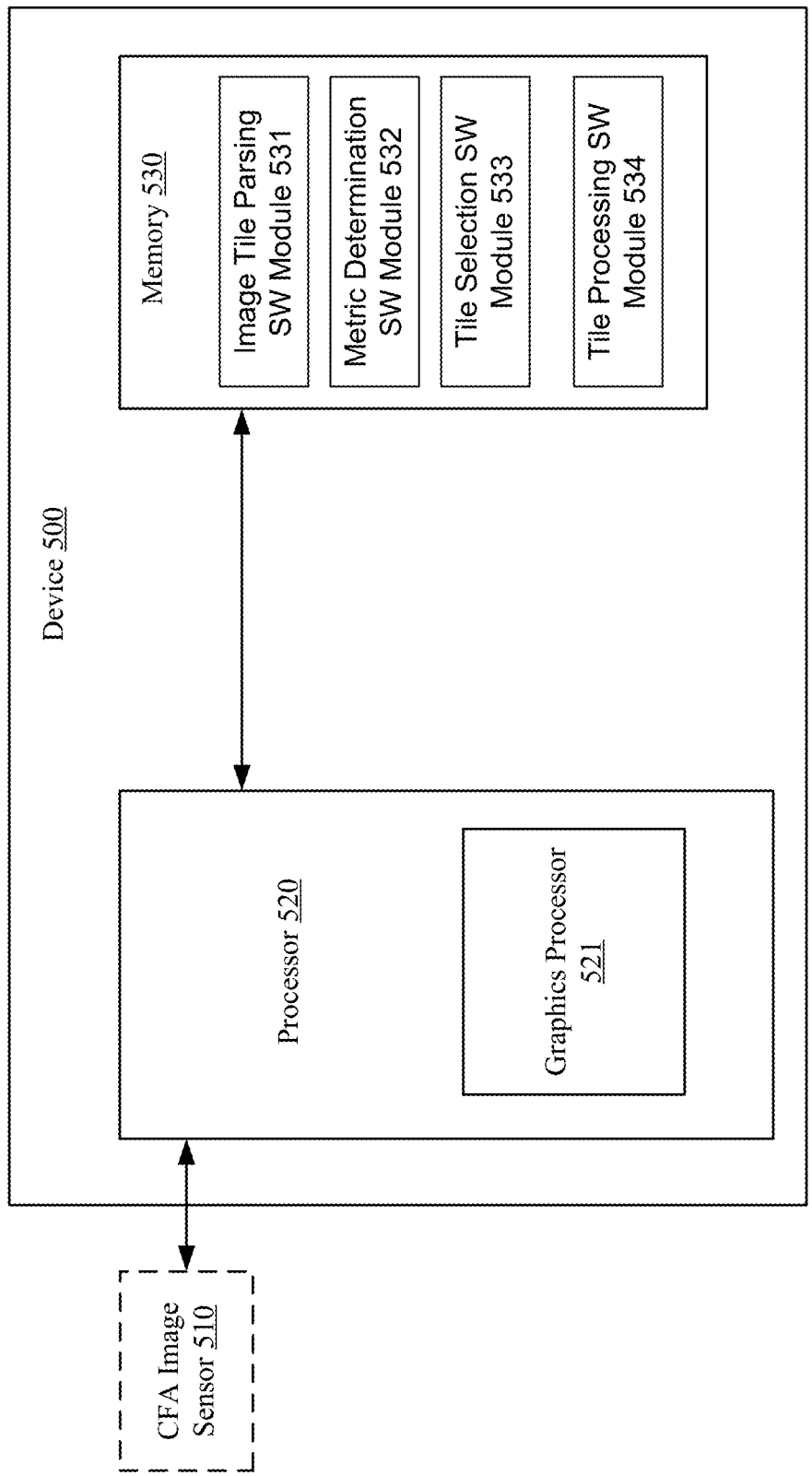
FIG. 5 is a block diagram of an example image processing device, according to some example implementations.

FIG. 5 is a block diagram of an example image processing device 500. In some example implementations, the image processing device 500 may include or be coupled to a CFA image sensor 510. The image processing device 500 may further include a processor 520, including a graphics processor 521, and a memory 530. The CFA image sensor 510 may include one or more color filter arrays (CFAs) arranged on a surface of the respective sensor, and may be coupled directly or indirectly to processor 520. The CFA image sensor 100 in FIG. 1 may be an example implementation of the CFA image sensor 510. While the CFA image sensor 510 is described as including a single image sensor for simplicity, the CFA image sensor 510 may include any number of cameras or image sensors.

The CFA image sensor 510 and the memory 530 may be coupled to the processor 520. While shown to be coupled to each other via the processor 520, the processor 520, the memory 530, and the CFA image sensor 510 may be coupled to one another in various arrangements. For example, the processor 520, the memory 530, and/or CFA image sensor 510 may be coupled to each other via one or more local buses (not shown for simplicity). While not shown in FIG. 5 for simplicity, the image processing device 500 may further include or be coupled to one or more displays, to one or more networks, to one or more image processing cores, such as a video encoding core, one or more image compression cores, a power source (such as a battery), and so on.

Memory 530 may include a non-transitory computer-readable medium (e.g., one or more nonvolatile memory elements, such as EPROM, EEPROM, Flash memory, a hard drive, and so on) that may store at least the following software (SW) modules:

an image tile parsing SW module 531 to parse, or decompose, received images, for example, from the CFA image sensor 510, into a plurality of tiles;

a metric determination SW module 532 to calculate one or more metrics for each of the plurality of parsed tiles;

a tile selection SW module 533 to select one or more tiles from the plurality of parsed tiles based at least in part on the calculated one or more metrics; and a tile processing SW module 534 to perform one or more image processing operations, such as one or more demosaicing operations, on tiles of the plurality of tiles, for example using graphics processor 521.

Each software module includes instructions that, when executed by processor 520, cause the image processing device 500 to perform the corresponding functions. The non-transitory computer-readable medium of memory 530 thus includes instructions for performing all or a portion of the operations depicted in FIG. 9.

Processor 520 may be any suitable one or more processors capable of executing scripts or instructions of one or more software programs stored in the image processing device 500 (e.g., within memory 530). In some example implementations, the processor 520 is one or more image signal processors (ISPs) that are part of a camera controller (not shown) for controlling the CFA image sensor 510. Processor 520 may include one or more stages of an image processing pipeline, for example as part of the graphics processor 521. For example, the processor 520 may execute the image tile parsing SW module 531 to parse, or decompose, received images from the CFA image sensor 510 into a plurality of tiles. Processor 520 may also execute the metric determination SW module 532 to calculate one or more metrics for each of the plurality of parsed tiles. Processor 520 may further execute the tile selection SW module 533 to select one or more tiles from the plurality of parsed tiles based at least in part on the calculated one or more metrics. Processor 520 may further execute the tile processing SW module 534 to perform one or more image processing operations on tiles of the plurality of tiles. For example, graphics processor 521 may perform one or more demosaicing operations on the tiles of the plurality of tiles. While the below examples and implementations are described regarding the image processing device 500 of FIG. 5, other example devices may be used to perform the examples, and the present disclosure should not be limited to the example image processing device 500.

Images captured using one or more CFA image sensors may be demosaiced to interpolate the color and intensity data of pixels of the captured image, such as interpolating green pixel data for a pixel where only red light is captured. However, the interpolation may introduce errors (such as artifacts, moiré patterns, and false color) to a processed image. While DNN-based demosaicing techniques may be effective at reducing or minimizing the errors, DNN-based demosaicing techniques may be prohibitively costly to implement and time-consuming to use for a high-resolution image, as compared with faster and simpler hardware-based techniques. In some example implementations, a device may selectively process portions of a captured image using DNN-based techniques, and process other portions of the captured image using one or more other demosaicing techniques. For example, a device may parse a captured image into a plurality of tiles, and the device may calculate or determine one or more metrics for each tile of the plurality of tiles. Based on the one or more metrics, the device may select one or more tiles for processing using a first demosaicing technique (such as a DNN-based demosaicing technique). The device also may process one or more unselected tiles using one or more other demosaicing techniques (such as a hardware-based demosaicing technique).

In some example implementations, each tile may be square with a size of 7 pixels by 7 pixels. However, the tiles may have other suitable sizes (such as 4×4, 5×5, etc.) or shapes (such as rectangular), and the present disclosure should not be limited by any specific size and shape of tile.

In some example implementations, tiles may be selected based on one or more metrics. The metrics may include a sum of absolute differences (SAD) metric and a pixel saturation metric. Such a SAD metric may correspond to a summation over a tile of the absolute value of the differences between a chrominance of each pixel of the tile and an average chrominance of the tile. In one example, the SAD metric may correspond to a maximum SAD for a given color, such that the SAD metric is given by max(SAD(red), SAD(green), SAD(blue)), where SAD(color) is a sum of absolute differences of pixels of that color over a tile. For example, a tile having a SAD metric exceeding a SAD threshold may indicate that the tile contains significant variations, such as closely spaced edges and other detailed features. As a result, a device may select the tile to be processed using a DNN-based demosaicing technique based on the SAD metric exceeding a SAD threshold for the tile. Another metric is a pixel saturation (SAT) metric. Such a SAT metric may indicate how saturated the chrominance of a tile is. An example SAT metric may be given by $$\left(\frac{\text{mean(red)}}{\text{mean(green)}} + \frac{\text{mean(blue)}}{\text{mean(green)}} - 2\right),$$

where mean(color) is a mean chrominance value for a tile. A tile having a SAT metric less than the SAT threshold may indicate that the pixels of the tile have relatively low saturation. As a result, a device may select the tile to be processed using a DNN-based demosaicing technique based on the SAT metric not exceeding a SAT threshold for the tile. In some other example implementations, a device may select a tile based on the tile's SAD metric and SAT metric. For example, a tile may be selected when the tile has a SAD metric greater than the SAD threshold and has a SAT metric less than the SAT threshold.

Figure 6:
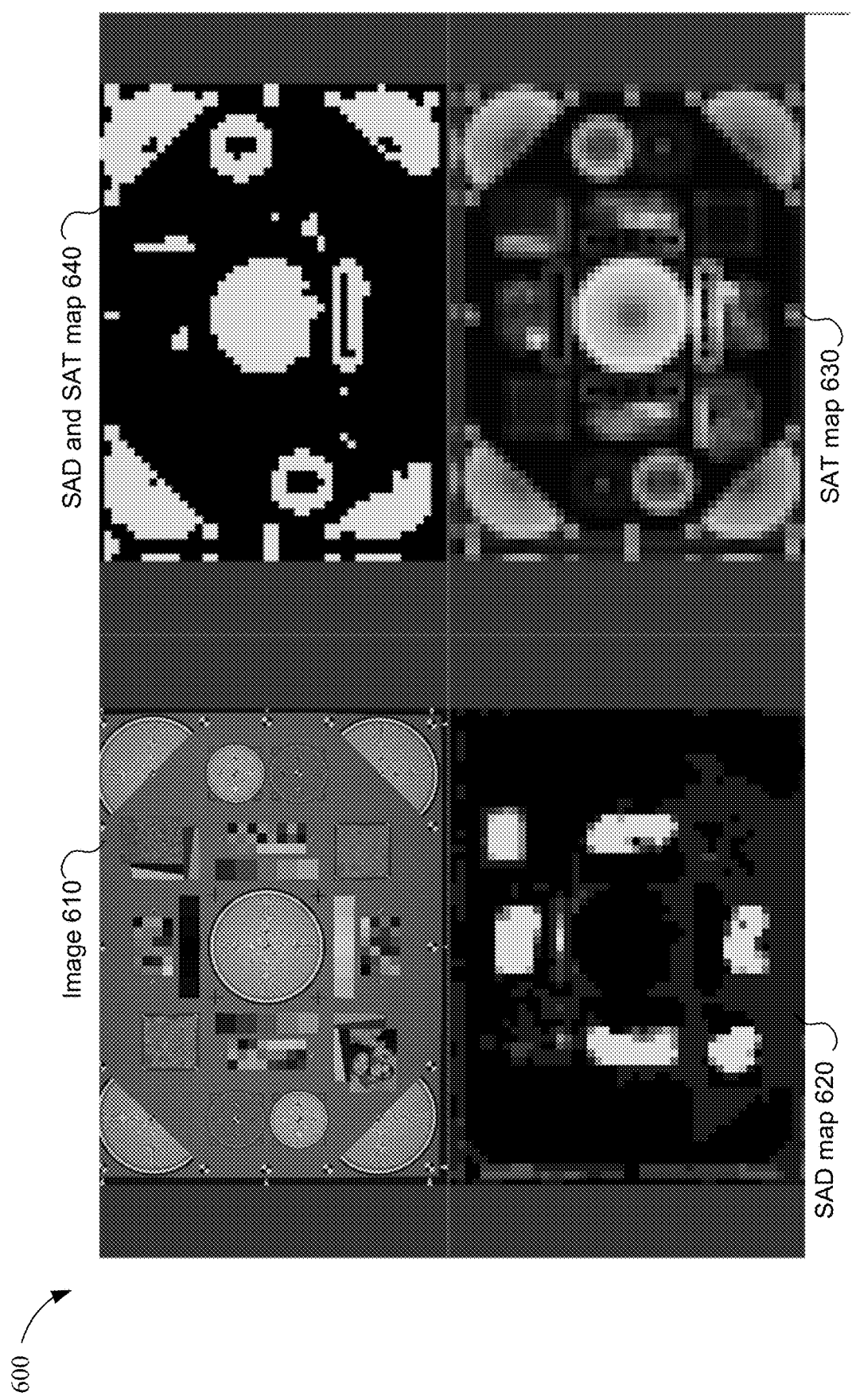
FIG. 6 is an illustration of example metrics for image tile selection, according to some example implementations.

FIG. 6 is an illustration of a set of corresponding images 600 to illustrate how one or more tile selection metrics may be used for selecting one or more portions of an image for DNN-based processing, according to some example implementations. The image 610 may be an original image captured by a CFA image sensor. The SAD map 620 is a monochrome image depicting a map of SAD metric values for the tiles of the original image 610. Each pixel in the SAD map 620 may correspond to a tile of the original image 610, and the brightness of each pixel of the SAD map 620 may correspond to the SAD metric value for the corresponding tile of the original image 610. Brighter pixels may indicate a larger SAD metric value than darker pixels. In this manner, selecting tiles having the SAD metric greater than the SAD threshold may correspond to selecting pixels of the SAD map 620 having at least a threshold brightness. As seen in the SAD map 620, the brighter pixels correspond to more detailed areas of the original image 610. DNN-based demosaicing may be performed on portions of the original image 610 including the brighter pixels.

The SAT map 630 is a monochrome image depicting a map of SAT metric values for tiles of the original image 610. Similar to the SAD map 620, each pixel in the SAT map 630 may correspond to a tile of the original image 610, and the brightness of each pixel in the SAT map 630 may correspond to the SAT metric value for the corresponding tile of the original image 610. Brighter tiles indicate lower SAT metric values than darker tiles. In this manner, selecting tiles having the SAT metric less than the SAT threshold may correspond to selecting pixels of the SAT map 630 having at least a threshold brightness. As seen in the SAT map 630, the brighter pixels may correspond to more detailed areas of the original image 610, where DNN-based demosaicing techniques may be more beneficial.

In some examples, tiles may be selected having the SAD metric greater than an SAD threshold or having the SAT metric less than an SAT threshold. In some other examples, the two metrics may be combined or used in selecting one or more tiles of an image. The SAD and SAT map 640 is a monochrome image depicting a selection map combining the SAD metric and the SAT metric. The example SAD and SAT map 640 is a map of 1-bit values (such as black and white), and each pixel of the SAD and SAT map 640 corresponds to a tile of the original image 610. In the example SAD and SAT map 640, a pixel is white if the corresponding tile has an SAD metric greater than the SAD threshold and having an SAT metric less than the SAT threshold. A pixel is black if the corresponding tile has an SAD metric less than the SAD threshold or having an SAT metric greater than the SAT threshold. In this manner, the white pixels of the SAD and SAT map 640 may indicate the tiles to be selected for processing using DNN-based demosaicing techniques.

Figure 7:
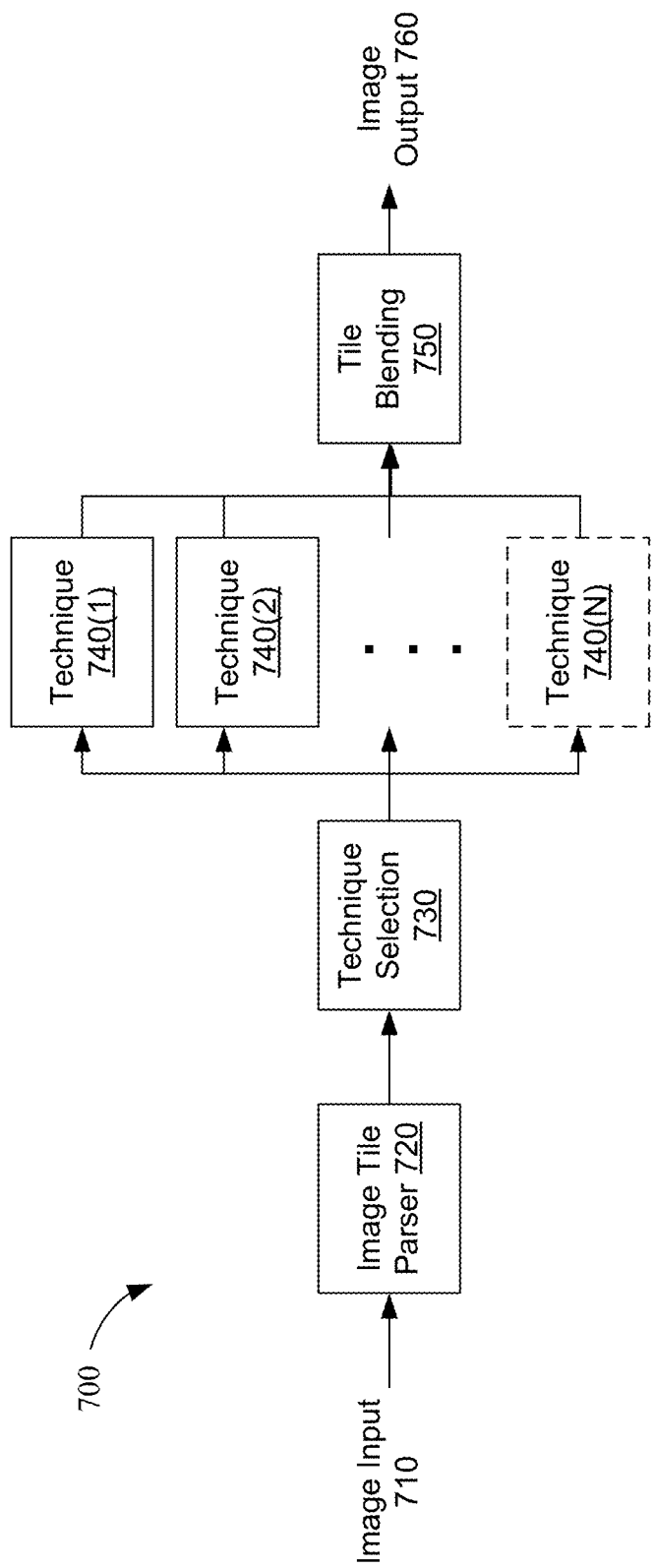
FIG. 7 is an illustrative block diagram of a portion of an example image processing pipeline for selectively processing tiles of a captured image, according to some example implementations.

FIG. 7 is an illustrative block diagram of a portion of an example image processing pipeline 700, according to the example implementations. In some example implementations, the pipeline portion 700, which may be implemented in or using image processing device 500 of FIG. 5. For example, the image processing pipeline portion 700 may be implemented in the graphics processor 521. The image processing pipeline portion 700 may receive an image via image input 710. For example, the image received at image input 710 may be a CFA image captured by a suitable CFA image sensor, such as CFA image sensor 510, which is provided to the image tile parser 720. The image tile parser 720 may then parse the image into a plurality of tiles. The tiles may be of equal size and shape. For example, each tile may be square or rectangular in shape and have a size of 7 pixels by 7 pixels. In some other example implementations, the tiles may be different shapes and/or sizes, and the tiles may not be of a uniform shape and/or size.

One or more metrics may then be determined for each of the parsed tiles using technique selection module 730. In some example implementations, an SAD metric may be determined, an SAT metric may be determined, or an SAD metric and an SAT metric may be determined. Other suitable metrics may also be determined (such as one or more temporal or spatial metrics), as discussed further below. Based on the one or more determined metrics for each tile, the selection module 730 may select one of the techniques 740 for processing the tile. In some example implementations, the techniques 740 may include a first technique 740(1), such as a DNN-based demosaicing technique, and a second technique 740(2), such as a conventional hardware-based demosaicing technique. The techniques 740 also may optionally include additional techniques (such as up to technique 740(N)). If the first technique is a DNN-based demosaicing technique, the technique selection module 730 may select the first technique 740(1) for processing a tile when an SAD metric is greater than an SAD threshold. Additionally or alternatively, the technique selection module 730 may select the first technique 740(1) for processing a tile when an SAT metric is less than an SAT threshold. Alternatively, the technique selection module 730 may select the first technique 740(1) for processing a tile when the SAD metric is greater than the SAD threshold and the SAT metric is less than the SAT threshold. Unselected tiles may be processed using the second technique 740(2). After tiles have been processed according to the techniques 740, the processed tiles may be blended or assembled using tile blending module 750 into a single image, and may blend adjacent tiles, ensuring that seams are minimized, colors matched, and so on. The blended image may then be output via image output 760.

While the above techniques have been described in terms of demosaicing captured CFA images, the pipeline portion 700 may also be applied in other image processing contexts. In some example implementations, in addition to using the SAD metric and/or SAT metric for selectively processing tiles of a captured image according to a DNN-based demosaicing technique or a simpler hardware-based demosaicing technique, additional metrics may be used for processing other types of captured images. For example, noise from the motion of objects may exist in a captured image. Denoising techniques to reduce noise may be based on a current frame of image data and one or more previous frames of image data. For selective temporal denoising, a noise metric may be used to determine one or more portions of the captured image including moving objects to denoise, and to determine one or more portions of the captured image not including moving objects (i.e., the portion is static across frames) to not process or to process with other techniques.

Accordingly, some example implementations may parse a captured image into a plurality of tiles, and determine, based on one or more metrics, which tiles include moving objects. Tiles determined to include moving objects may then be processed using a first denoising technique (such as a bilateral filter). Such a filtering technique may be performed, for example, using hardware processing. Tiles determined not to include moving objects may be processed according to one or more second denoising techniques (such as an adaptive mean filter). An adaptive mean filter may be performed by a digital signal processor (DSP) or other suitable processors. Suitable metrics may be chosen for determining which tiles contain moving objects. For example, an appropriate metric may compare a current frame of image data to a previous frame of image data and determine a map of SAD between the current frame and the previous frame. In some examples, one or more noise thresholds may be determined for the current frame, and the noise thresholds may be used for blending portions of the image which have been processed according to the first denoising technique, such as the bilateral filtering technique, and those portions of the image which have been processed according to the one or more second denoising techniques, such as the adaptive mean filtering technique.

Figure 8A:
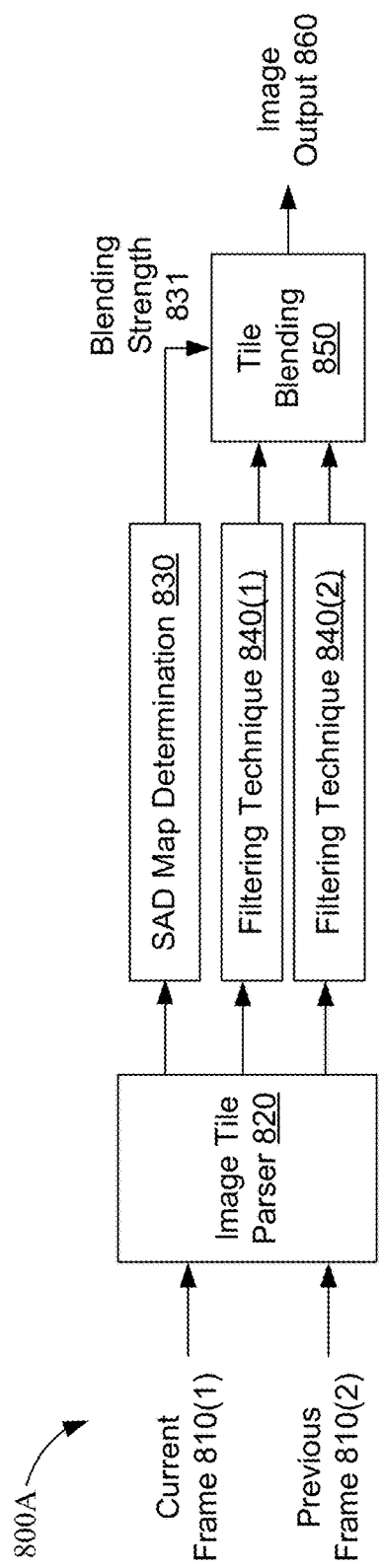
FIG. 8A is an illustrative block diagram of a portion of another example image processing pipeline for selectively processing tiles of a captured image, according to some example implementations.

FIG. 8A shows an illustrative block diagram of a portion of another example image processing pipeline 800A for selective temporal denoising, according to some example implementations. A current frame 810(1) of image data and a previous frame 810(2) of image data may be received, for example from an image sensor. The current frame 810(1) and the previous frame 810(2) may be parsed into a plurality of tiles by image tile parser 820. The plurality of tiles may be sent to the SAD map determination module 830. The SAD may be determined for each tile of the plurality of tiles, where each tile of the current frame 810(1) is compared to a corresponding tile of the previous frame 810(2) for determining the SAD. The determined SAD for each tile may be called a SAD map for the image. While only one arrow is shown connecting the image tile parser 820 and the SAD map determination module 830, that tiles from each of the current frame 810(1) and the previous frame 810(2) may be provided to the SAD map determination module 830. The SAD map determination module 830 may determine a blending strength 831 for each of the plurality of tiles, as discussed further below. The plurality of tiles may also be provided to a first filtering technique 840(1) and to a second filtering technique 840(2). In some examples, the first filtering technique 840(1) may be a bilateral filtering technique, while the second filtering technique 840(2) may be an adaptive mean filtering technique. Each of the plurality of tiles may be processed using the first filtering technique 840(1) and the second filtering technique 840(2), and the results provided to the tile blending module 850. The tile blending module 850 may blend the processed tiles from the filtering techniques 840(1) and 840(2) based on the blending strength 831. More particularly, the blending strength 831 may be used for determining a proportion of an output tile should reflect the tile as processed using the first filtering technique 840(1) or the tile as processed using the second filtering technique 840(2). The blending module 850 may assemble a processed image based on the received processed tiles, and output the processed image via image output 860.

Figure 8B:
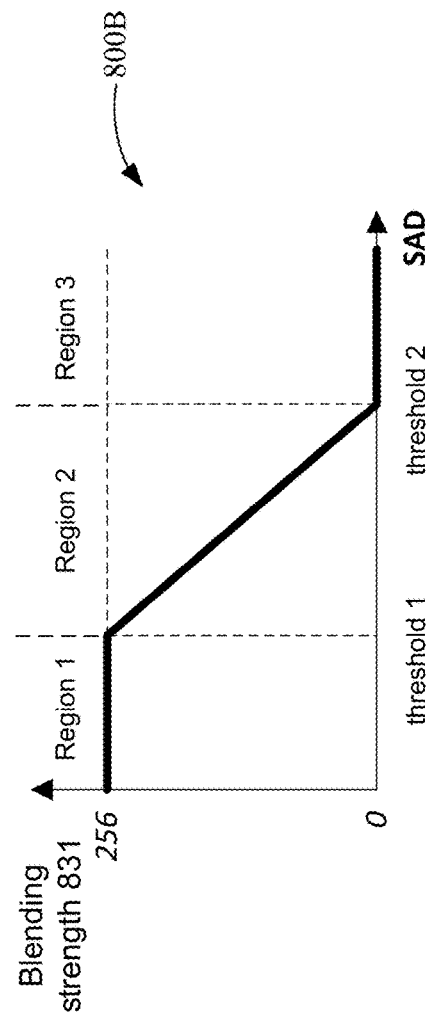
FIG. 8B is an illustration of an example relationship between blending strength and a sum of absolute differences (SAD) metric for the example block diagram of FIG. 8A.

As discussed above, for tiles showing objects in motion, a first filtering technique 840(1) may be appropriate, such as a bilateral filter. In contrast, for tiles showing stationary objects not in motion, a second filtering technique 840(2) may be more appropriate, such as an adaptive mean filter. Tiles having more than a threshold difference relative to a previous tile may indicate that the tile includes one or more objects in motion. Thus, the tile blending module 850 may allocate more weight to the tile output from the first filtering technique 840(1) when the tile has a SAD greater than a threshold, and may allocate more weight to the tile output of the second filtering technique 940(2) when the tile has SAD less than the threshold. FIG. 8B is an illustration of a plot 800B indicating an example relationship between the SAD as determined by SAD determination module 830 and the blending strength 831 as provided to the tile blending module 850. Note that for the example shown in FIG. 8B, larger values of the blending strength 831 indicate a larger weight should be provided to the second filtering technique 840(2), while smaller values of the blending strength 831 indicate a larger weight should be provided to the first filtering technique 840(1). Note also that the blending strength 831 is depicted as ranging between 0 and 256, but in other examples may have other ranges, for example a normalized range between 0 and 1, and so on. In the example of FIG. 8B there may be a first range of SAD values noted as region 1 where the blending strength 831 has a maximum value. A tile having an SAD in region 1 may indicate that a full weight should be given to the second filtering technique 840(2), because the tile is largely unchanged between the previous frame and the current frame—in other words, the tile contains stationary objects. SAD between zero and a first threshold, noted in FIG. 8B as threshold 1, may be located in region 1. Further, there may be a third region, noted as region three, where the blending strength 831 has a minimum value. A tile having an SAD in region 3 may indicate that a full weight should be given to the first filtering technique 840(1), because the tile is significantly changed between the previous frame and the current frame—in other words, the tile contains objects in motion. An SAD greater than a second threshold value, noted in FIG. 8B as threshold 2, may be located in region 3. Tiles having an SAD between the threshold 1 and the threshold 2 may be located in region 2. A tile having an SAD in region 2 may indicate that the output tile from the blending module 850 should be proportionally blended from a combination of the output tile from the first filtering technique 840(1) and the output tile from the second filtering technique 840(2). In the example of FIG. 8B, the proportions may be determined linearly, such that more weight is given to the second filtering technique 840(2) for tiles having SAD near the first threshold, while more weight is given the first filtering technique 840(1) for tiles having SAD near the second threshold. The example relationship between blending strength 831 and the SAD in plot 800B in FIG. 8B is only one example, and other suitable relationships may be used for other example implementations.

The thresholds threshold1 and threshold2 may vary depending on a number of factors, such as sensor-specific characteristics with respect to noise and color. The threshold may also depend on processing capabilities of an image processing device. For example, for a device having greater processing capabilities, more tiles may be assigned for processing using higher-complexity techniques as compared with a device having lesser processing capabilities.

Note that while the pipeline portion 800A is described as performing the operations of the first and the second filtering techniques 840(1) and 840(2) for each of the parsed tiles, in some implementations the blending strength 831 may be used for determining respective first and second portions of the parsed tiles to remain unprocessed by the first and second filtering techniques 840(1) and 840(2). For example, the blending strength 831 assigns no weight to the first filtering technique 840(1) in region 1. Consequently, the first portion of the parsed tiles—tiles having SAD below the first threshold—may not be processed by the first filtering technique 840(1). Similarly, in region 3, no weight is assigned to the second filtering technique 840(2), and thus the second portion of the parsed tiles—tiles having SAD above the second threshold—may not be processed by the second filtering technique 840(2). Refraining from processing the first portion of the parsed tiles by the first filtering technique 840(1) and refraining from processing the second portion of the parsed tiles by the second filtering technique 840(2) may allow the circuit 800A to avoid processing tiles which will be assigned no weight in the output image 860.

Figure 9:
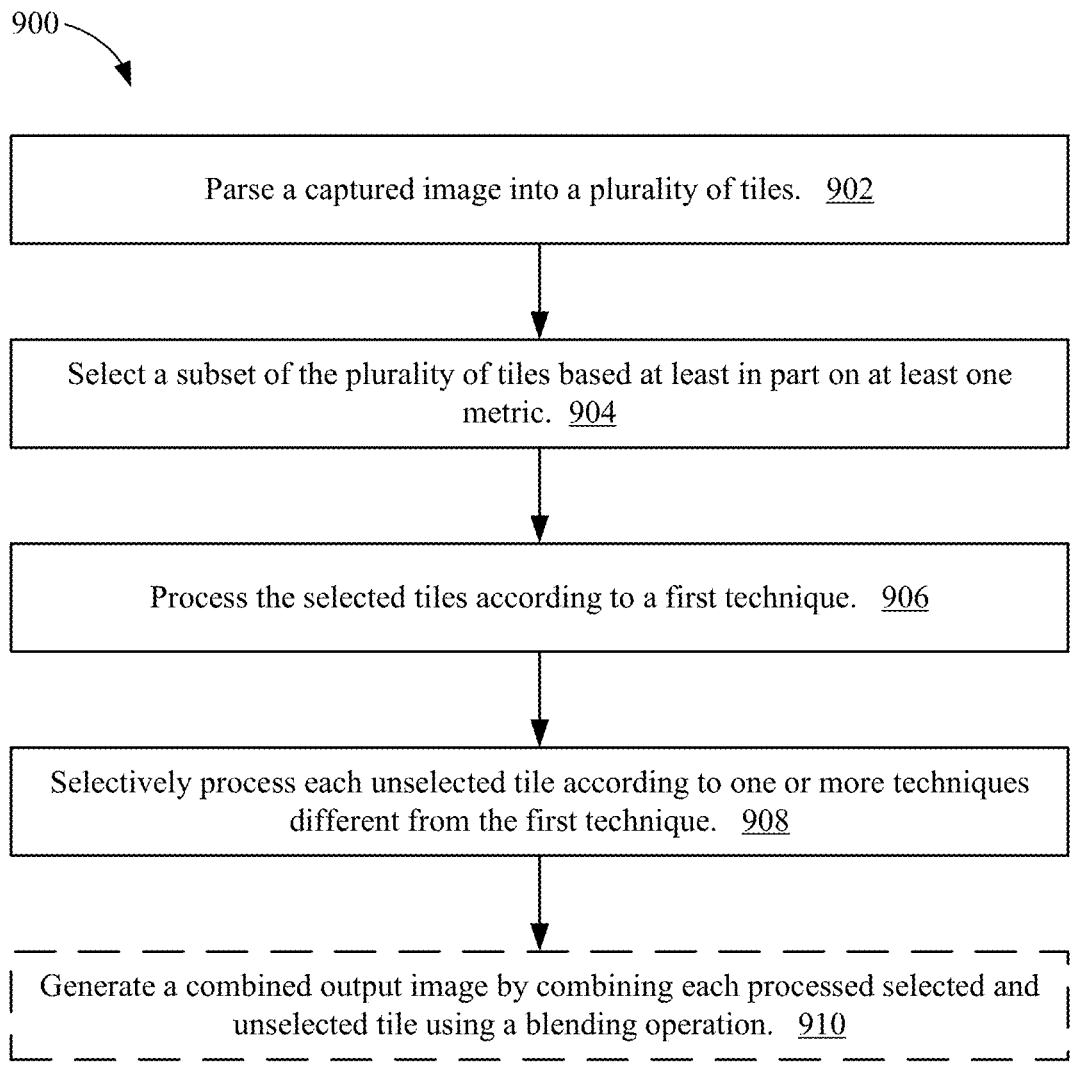
FIG. 9 is an illustrative flow chart depicting an example operation for selectively processing tiles of a captured image, according to some example implementations.

FIG. 9 is an illustrative flow chart depicting an example operation 900 for selectively processing tiles of a captured image, according to the example implementations. The example operation 900 may be performed using any suitable image processing device, such image processing device 500, or using pipeline portions 700 or 800A. However, other devices or systems may be used, and the present disclosure should not be limited by the examples or the description of implementation using the image processing device 500, or pipeline portions 700 or 800A.

With respect to FIG. 9, a captured image may be parsed as a plurality of tiles (902). For example, the image may be an image captured by a CFA image sensor, such as the CFA image sensor 510 in FIG. 5. Further, the captured image may be received via image input 710 of FIG. 7 or one or more of current frame input 810(1) or previous frame input 810(2) of FIG. 8A. In some implementations the captured image may be parsed by executing image tile parsing SW module 531 of image processing device 500 of FIG. 5, using image tile parser 720 of FIG. 7 or using image tile parser 820 of FIG. 8A. A subset of the plurality of tiles may be selected based at least in part on at least one metric (904). For example, the subset of the plurality of tiles may be selected by executing metric determination SW module 532 or tile selection SW module 533 of image processing device 500 of FIG. 5, or using technique selection module 730 of FIG. 7, or using SAD map determination module 830 of FIG. 8A. In some implementations, the at least one metric may include an SAD metric, and/or an SAT metric. The selected tiles may be processed according to a first technique (906). For example, the selected tiles may be processed by executing tile processing SW module 534 of image processing device 500 of FIG. 5, using technique 740(1) of FIG. 7, or using filtering technique 840(1) of FIG. 8A. In some implementations, the first technique may be a DNN-based demosaicing technique, or a bilateral filtering technique. Each unselected tile may be selectively processed according to one or more techniques different from the first technique (908). For example, each unselected tile may be selectively processed by executing tile processing SW module 534 of image processing device 500 of FIG. 5, using one or more of techniques 740(2)-740(N) of FIG. 7, or using filtering technique 840(2) of FIG. 8A. In some examples, the unselected tiles may be processed according to a hardware-based demosaicing technique, or according to an adaptive mean filtering technique. A combined output image may be generated by combining each processed selected and unselected tile using a blending operation (910). For example, the combined output image may be generated by executing tile processing SW module 534 of image processing device 500, using tile blending module 750 of FIG. 7, or using tile blending module 850 of FIG. 8A.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 530 in the example image processing device 500 of FIG. 5) comprising instructions that, when executed by the processor 520 (or the graphics processor 521), cause the device 500 to perform one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random-access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 204 or the graphics processor 520 in the example image processing device 500 of FIG. 5. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, the steps of the described example operations, if performed by the image processing device 500, the processor 520, and/or the graphics processor 521, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method for selectively processing tiles of a captured image, the method comprising:
   parsing pixels of the captured image into a plurality of tiles where each tile only includes a set of contiguously positioned pixels of the captured image, each tile defining a respective spatial portion of the captured image;
   selecting a subset of tiles among the plurality of tiles based at least in part on at least one metric;
   processing the selected subset of tiles according to a first technique; and
   selectively processing each unselected tile among the plurality of tiles according to one or more techniques that is different from the first technique,
   wherein the first technique and the one or more techniques are each one from the group consisting of an image demosaicing technique and an image denoising technique.

2. The method of claim 1, further comprising capturing, by a color filter array (CFA) image sensor, an image to obtain the captured image wherein the captured image is a mosaiced image.

3. The method of claim 2, wherein the at least one metric comprises at least one from the group consisting of a sum of absolute differences (SAD) metric and a pixel saturation (SAT) metric.

4. The method of claim 3, wherein selecting the subset of tiles of the plurality of tiles comprises selecting each tile having the SAD metric greater than a SAD threshold.

5. The method of claim 3, wherein selecting the subset of tiles of the plurality of tiles comprises selecting each tile having the SAT metric less than a SAT threshold.

6. The method of claim 2, wherein processing the selected subset of tiles according to the first technique comprises demosaicing the selected subset of tiles using a deep neural network.

7. The method of claim 6, wherein selectively processing each unselected tile comprises processing each unselected tile using a hardware-based demosaicing technique.

8. The method of claim 1, further comprising generating a combined output image based on a combination of the selected subset of tiles and the unselected tiles using a blending operation.

9. The method of claim 8, further comprising assigning weights to respective portions of adjacent tiles that overlap one another and blending the respective portions based on the assigned weights.

10. The method of claim 1, wherein the subset of tiles of the plurality of tiles is selected based at least in part on a sum of absolute differences between each tile and a corresponding tile of a temporally previous captured image.

11. An image processing device configured to selectively process tiles of a captured image, comprising:
    a memory configured to store image data; and
    one or more processors implemented in circuitry and in communication with the memory, the one or more processors being configured to:
      parse pixels of the captured image into a plurality of tiles where each tile only includes a set of contiguously positioned pixels of the captured image, each tile defining a respective spatial portion of the captured image;
      select a subset of tiles among the plurality of tiles based at least in part on at least one metric;
      process the selected subset of tiles according to a first technique; and
      selectively process each unselected tile among the plurality of tiles according to one or more techniques that is different from the first technique,
      wherein the first technique and the one or more techniques are each one from the group consisting of an image demosaicing technique and an image denoising technique.

12. The image processing device of claim 11, further comprising a color filter array (CFA) image sensor configured to capture an image to obtain the captured image wherein the captured image is a mosaiced image.

13. The image processing device of claim 12, wherein the at least one metric comprises at least one from the group consisting of a sum of absolute differences (SAD) metric and a pixel saturation (SAT) metric.

14. The image processing device of claim 13, wherein the one or more processors is further configured to select tiles having the SAD metric greater than a SAD threshold as the subset of tiles.

15. The image processing device of claim 13, wherein the one or more processors is further configured to select tiles having the SAT metric less than a SAT threshold as the subset of tiles.

16. The image processing device of claim 12, wherein the one or more processors is further configured to demosaic the selected subset of tiles using a deep neural network.

17. The image processing device of claim 16, wherein the one or more processors is configured to process each unselected tile using a hardware-based demosaicing technique.

18. The image processing device of claim 11, wherein the one more processors is further configured to generate a combined output image based on a combination of the selected subset of tiles and the unselected tiles using a blending operation.

19. The image processing device of claim 18, wherein the one or more processors is further configured to assign weights to respective portions of adjacent tiles that overlap one another and to blend the respective portions based on the assigned weights.

20. The image processing device of claim 11, wherein the subset of tiles of the plurality of tiles is selected based at least in part on a sum of absolute differences between each tile and a corresponding tile of a temporally previous captured image.

21. A non-transitory, computer-readable storage medium storing instructions that, when executed by one or more processors of an image processing device, cause the image processing device to:
    parse pixels of a captured image into a plurality of tiles where each tile only includes a set of contiguously positioned pixels of the captured image, each tile defining a respective spatial portion of the captured image;
    select a subset of tiles among the plurality of tiles based at least in part on at least one metric;
    process the selected subset of tiles according to a first technique; and selectively process each unselected tile among the plurality of tiles according to one or more techniques that is different from the first technique, wherein the first technique and the one or more techniques are each one from the group consisting of an image demosaicing technique and an image denoising technique.

22. The non-transitory, computer-readable storage medium of claim 21, wherein the at least one metric comprises one from the group consisting of a sum of absolute differences (SAD) metric and a pixel saturation (SAT) metric.

23. The non-transitory, computer-readable storage medium of claim 22, further comprising instructions that, when executed, cause the one or more processors to select tiles having the SAD metric greater than a SAD threshold.

24. The non-transitory, computer-readable storage medium of claim 22, further comprising instructions that, when executed, cause the one or more processors to select tiles having the SAT metric greater than a SAT threshold.

25. The non-transitory, computer-readable storage medium of claim 21, further comprising instructions that, when executed, cause the one or more processors to demosaic the selected subset of tiles using a deep neural network.

26. The non-transitory, computer-readable storage medium of claim 25, further comprising instructions that, when executed, cause the one or more processors to process each unselected tile using a hardware-based demosaicing technique.

27. The non-transitory, computer-readable storage medium of claim 21, further comprising instructions that, when executed, cause the one or more processors to generate a combined output image based on a combination of the selected subset of tiles and the unselected tiles using a blending operation.

28. The non-transitory, computer-readable storage medium of claim 27, further comprising instructions that, when executed, cause the one or more processors to assign weights to respective portions of adjacent tiles that overlap one another and to blend the respective portions based on the assigned weights.

29. An image processing device, comprising:
means for parsing pixels of a captured image into a plurality of tiles where each tile only includes a set of contiguously positioned pixels of the captured image, each tile defining a respective spatial portion of the captured image;
means for selecting a subset of tiles among the plurality of tiles based at least in part on at least one metric;
means for processing the selected subset of tiles according to a first technique; and
means for selectively processing each unselected tile among the plurality of tiles according to one or more techniques that is different from the first technique,
wherein the first technique and the one or more techniques are each one from the group consisting of an image demosaicing technique and an image denoising technique.

30. An image processing device configured to selectively process tiles of captured image data, comprising:
a memory configured to store the captured image data; and
one or more processors implemented in circuitry and in communication with the memory, the one or more processors being configured to:
parse the captured image data into a plurality of tiles;
select a subset of tiles among the plurality of tiles based at least in part on at least one metric comprising at least one of a sum of absolute differences (SAD) metric and a pixel saturation (SAT) metric;
process the subset of tiles according to a first technique; and
selectively process each unselected tile among the plurality of tiles according to one or more techniques that is different from the first technique,
wherein the first technique and the one or more techniques are each from the group consisting of an image demosaicing technique and an image denoising technique.

31. The image processing device of claim 30 being configured to obtain the captured image data from an image sensor.

32. The image processing device of claim 30, wherein the one or more processors is further configured to select, as the subset of tiles, tiles having respective SAD metrics greater than a SAD threshold.

33. The image processing device of claim 30, wherein the one or more processors is further configured to select, as the subset of tiles, tiles having respective SAT metrics less than a SAT threshold as the subset of tiles.

34. The image processing device of claim 30, wherein the one or more processors is further configured to demosaic the subset of tiles using a deep neural network.

35. The image processing device of claim 34, wherein the one or more processors is further configured to process each unselected tile using a hardware-based demosaicing technique.

36. The image processing device of claim 30, wherein the one more processors is further configured to generate a combined output image based on a combination of the subset of tiles and the unselected tiles using a blending operation.

37. The image processing device of claim 36, wherein the one or more processors is further configured to assign weights to respective portions of adjacent tiles that overlap one another and to blend the respective portions based on the assigned weights.

38. An image processing device configured to selectively process tiles of captured image data, comprising:
a memory configured to store the captured image data; and
one or more processors implemented in circuitry and in communication with the memory, the one or more processors being configured to:
parse the captured image data into a plurality of tiles;
select a subset of tiles among the plurality of tiles based at least in part on a sum of absolute differences between tiles of the captured image data and corresponding tiles within temporally, previously captured image data;
process the subset of tiles according to a first technique; and
selectively process each unselected tile among the plurality of tiles according to one or more techniques that is different from the first technique,
wherein the first technique and the one or more techniques are each from the group consisting of an image demosaicing technique and an image denoising technique.

* * * * *